US008589288B1

(12) United States Patent
Meyer et al.

(10) Patent No.: US 8,589,288 B1
(45) Date of Patent: Nov. 19, 2013

(54) SYSTEM AND METHOD FOR ELECTRONIC REMITTANCE OF FUNDS

(75) Inventors: Shannon D. Meyer, Joliet, IL (US); Margaret A. Haggerty, New York, NY (US); Rick Schwabinger, Forest Hills, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 276 days.

(21) Appl. No.: 12/896,630

(22) Filed: Oct. 1, 2010

(51) Int. Cl.
*G06Q 40/00* (2012.01)
(52) U.S. Cl.
USPC ................................. 705/39; 705/35; 705/40
(58) Field of Classification Search
USPC ................................................ 705/35, 39, 40
See application file for complete search history.

(56) References Cited

U.S. PATENT DOCUMENTS

| | | | |
|---|---|---|---|
| 2,005,003 | A | 6/1935 | Patton et al. |
| 3,653,480 | A | 4/1972 | Yamamoto et al. |
| 3,938,090 | A | 2/1976 | Borison et al. |
| 4,050,375 | A | 9/1977 | Orlens |
| 4,141,078 | A | 2/1979 | Bridges et al. |
| 4,205,780 | A | 6/1980 | Burns |
| 4,264,808 | A | 4/1981 | Ownes et al. |
| 4,321,672 | A | 3/1982 | Braun et al. |
| 4,385,285 | A | 5/1983 | Horst et al. |
| 4,396,985 | A | 8/1983 | Ohara |
| 4,443,027 | A | 4/1984 | McNeely et al. |
| 4,453,074 | A | 6/1984 | Weinstein |
| 4,454,414 | A | 6/1984 | Benton |
| RE31,692 | E | 10/1984 | Tyburski et al. |
| 4,495,018 | A | 1/1985 | Vohrer |
| 4,575,621 | A | 3/1986 | Dreifus |
| 4,605,844 | A | 8/1986 | Haggan |
| 4,614,861 | A | 9/1986 | Pavlov et al. |
| 4,617,457 | A | 10/1986 | Myers |
| 4,650,981 | A | 3/1987 | Foletta |

(Continued)

FOREIGN PATENT DOCUMENTS

| | | |
|---|---|---|
| EP | 0421808 | 4/1991 |
| EP | 0665486 | 8/1995 |

(Continued)

OTHER PUBLICATIONS

Alabama Department of Revenue Selects Unisys for Imaging Solution to Speed Tax Returns, Bus. Wire, Sep. 6, 1995.

(Continued)

*Primary Examiner* — Lalita M Hamilton
(74) *Attorney, Agent, or Firm* — Lowenstein Sandler LLP

(57) ABSTRACT

A system and method for enabling the remittance of funds is provided. More particularly, the fund remittance process of the present invention enables a sending entity having a source account at a financial institution to schedule a payment transaction for withdrawal by a designated receiving entity. A plurality of security codes are automatically generated upon processing a request to schedule a payment, wherein a first security code is communicated directly to the sending entity and a second security code is communicated directly to the designated receiving entity. The designated receiving entity may submit a request to retrieve the scheduled payment at a qualifying self-service machine. In interacting with the self service machine, security measures are deployed to execute one of a plurality of security code combination schemes in association with the first and second security codes. Upon validation, allocated funds associated with the scheduled payment are made available to the designated receiving entity for withdrawal.

16 Claims, 18 Drawing Sheets

(56) References Cited

U.S. PATENT DOCUMENTS

| | | |
|---|---|---|
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian |
| 4,701,601 A | 10/1987 | Francini et al. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |
| 4,823,264 A | 4/1989 | Deming |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,224,034 A | 6/1993 | Katz et al. |
| 5,225,978 A | 7/1993 | Petersen |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,276,311 A | 1/1994 | Hennige |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,343,529 A | 8/1994 | Goldfine et al. |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | Van Horn |
| 5,373,550 A | 12/1994 | Campbell |
| 5,382,784 A | 1/1995 | Eberhardt |
| 5,396,417 A | 3/1995 | Burks et al. |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | LaLonde |
| 5,479,494 A | 12/1995 | Clitherow |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Kleese |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,649,117 A | 7/1997 | Landry |
| 5,650,604 A | 7/1997 | Marcous et al. |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson et al. |
| 5,784,696 A | 7/1998 | Melnikof |
| 5,787,403 A | 7/1998 | Randle |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |

(56) References Cited

U.S. PATENT DOCUMENTS

| | | |
|---|---|---|
| 5,802,498 A | 9/1998 | Comesanas |
| 5,802,499 A | 9/1998 | Sampson et al. |
| 5,819,238 A | 10/1998 | Fernholz |
| 5,826,241 A | 10/1998 | Stein |
| 5,826,245 A | 10/1998 | Sandberg-Diment |
| 5,832,090 A | 11/1998 | Raspotnik |
| 5,832,447 A | 11/1998 | Rieker |
| 5,832,457 A | 11/1998 | O'Brien |
| 5,832,460 A | 11/1998 | Bednar |
| 5,832,463 A | 11/1998 | Houvener et al. |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,811 A | 12/1998 | Atkins |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,878,141 A | 3/1999 | Daly et al. |
| 5,883,377 A | 3/1999 | Chapin, Jr. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,907,142 A | 5/1999 | Kelsey |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,937,396 A * | 8/1999 | Konya ........................ 705/43 |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,949,044 A | 9/1999 | Walker et al. |
| 5,950,174 A | 9/1999 | Brendzel |
| 5,956,700 A | 9/1999 | Landry |
| 5,960,411 A | 9/1999 | Hartman et al. |
| 5,963,647 A | 10/1999 | Downing et al. |
| 5,963,659 A | 10/1999 | Cahill et al. |
| 5,963,925 A | 10/1999 | Kolling et al. |
| 5,966,698 A | 10/1999 | Pollin |
| 5,970,475 A | 10/1999 | Barnes et al. |
| 5,978,780 A | 11/1999 | Watson |
| 5,987,434 A | 11/1999 | Libman |
| 5,987,435 A | 11/1999 | Weiss et al. |
| 5,987,436 A | 11/1999 | Halbrook |
| 5,987,439 A | 11/1999 | Gustin |
| 5,991,749 A | 11/1999 | Morrill, Jr. |
| 5,991,750 A | 11/1999 | Watson |
| 6,000,832 A | 12/1999 | Franklin et al. |
| 6,002,767 A | 12/1999 | Kramer |
| 6,003,762 A | 12/1999 | Hayashida |
| 6,006,205 A | 12/1999 | Loeb et al. |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,029,153 A | 2/2000 | Bauchner et al. |
| 6,032,133 A | 2/2000 | Hilt et al. |
| 6,032,134 A | 2/2000 | Weissman |
| 6,032,136 A | 2/2000 | Brake, Jr. et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,036,099 A | 3/2000 | Leighton |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,092,057 A | 7/2000 | Zimmermann et al. |
| 6,098,053 A | 8/2000 | Slater |
| 6,098,070 A | 8/2000 | Maxwell |
| 6,101,479 A | 8/2000 | Shaw |
| 6,105,007 A | 8/2000 | Norris |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,138,917 A | 10/2000 | Chapin, Jr. |
| 6,141,666 A | 10/2000 | Tobin |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Leving |
| 6,236,972 B1 | 5/2001 | Shkedy |
| 6,240,444 B1 | 5/2001 | Fin et al. |
| 6,243,689 B1 | 6/2001 | Norton |
| 6,267,292 B1 | 7/2001 | Walker et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,301,567 B1 | 10/2001 | Leong et al. |
| 6,304,858 B1 | 10/2001 | Mosler et al. |
| 6,305,603 B1 | 10/2001 | Grunbok, Jr. et al. |
| 6,308,887 B1 | 10/2001 | Korman et al. |

(56) References Cited

U.S. PATENT DOCUMENTS

| | | |
|---|---|---|
| 6,321,212 B1 | 11/2001 | Lange |
| 6,324,524 B1 | 11/2001 | Lent et al. |
| 6,327,575 B1 | 12/2001 | Katz |
| 6,338,047 B1 | 1/2002 | Wallman |
| 6,338,049 B1 | 1/2002 | Walker et al. |
| 6,341,724 B2 | 1/2002 | Campisano |
| 6,343,279 B1 | 1/2002 | Bissonette et al. |
| 6,349,290 B1 | 2/2002 | Horowitz et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,405,181 B2 | 6/2002 | Lent et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,949 B1 | 7/2002 | Deaton et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,485,922 B1 | 11/2002 | Erickson et al. |
| 6,488,203 B1 | 12/2002 | Stoutenburg et al. |
| 6,490,568 B1 | 12/2002 | OMara et al. |
| 6,493,685 B1 | 12/2002 | Ensel et al. |
| 6,502,747 B1 | 1/2003 | Stoutenburg et al. |
| 6,513,019 B2 | 1/2003 | Lewis |
| 6,535,896 B2 | 3/2003 | Britton et al. |
| 6,536,663 B1 | 3/2003 | Lozier et al. |
| 6,554,184 B1 | 4/2003 | Amos |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| 6,736,314 B2 | 5/2004 | Cooper et al. |
| D490,840 S | 6/2004 | Arakaki et al. |
| D491,186 S | 6/2004 | Arakaki et al. |
| D491,953 S | 6/2004 | Arakaki et al. |
| 6,761,309 B2 | 7/2004 | Stoutenburg et al. |
| 6,769,605 B1 | 8/2004 | Magness |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,860,375 B2 | 3/2005 | Hallowell et al. |
| 6,865,547 B1 | 3/2005 | Brake, Jr. et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,943 B1 | 2/2006 | Johnson et al. |
| 7,004,382 B2 | 2/2006 | Sandru |
| 7,025,256 B1 | 4/2006 | Drummond et al. |
| 7,062,456 B1 | 6/2006 | Riehl et al. |
| 7,068,832 B1 | 6/2006 | Price et al. |
| 7,070,094 B2 | 7/2006 | Stoutenburg et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| RE40,220 E | 4/2008 | Nichols et al. |
| 7,380,707 B1 | 6/2008 | Fredman |
| 7,401,048 B2 | 7/2008 | Rosedale et al. |
| 7,493,288 B2 | 2/2009 | Biship et al. |
| 7,546,272 B2 | 6/2009 | Loy |
| 7,587,363 B2 | 9/2009 | Cataline et al. |
| 7,606,734 B2 | 10/2009 | Baig et al. |
| 7,610,222 B2 | 10/2009 | Neofytides et al. |
| 7,617,157 B2 | 11/2009 | Seifert et al. |
| 7,720,756 B2 * | 5/2010 | Kavounas ........................ 705/39 |
| 7,788,151 B2 * | 8/2010 | Pizzi et al. ........................ 705/35 |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0027441 A1 | 10/2001 | Wankmueller |
| 2001/0032139 A1 | 10/2001 | Debonnet, Jr. |
| 2001/0034663 A1 | 10/2001 | Teveler et al. |
| 2001/0037300 A1 | 11/2001 | Miyazaki et al. |
| 2001/0037309 A1 | 11/2001 | Vrain |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0023055 A1 | 2/2002 | Atognini et al. |
| 2002/0026394 A1 | 2/2002 | Savage et al. |
| 2002/0032651 A1 | 3/2002 | Embrey |
| 2002/0038363 A1 | 3/2002 | MacLean |
| 2002/0046169 A1 | 4/2002 | Keresman, III et al. |
| 2002/0047316 A1 | 4/2002 | Chitayat |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0084321 A1 | 7/2002 | Martens et al. |
| 2002/0087415 A1 | 7/2002 | Allen et al. |
| 2002/0087462 A1 | 7/2002 | Seifert et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 | 9/2002 | Kawan et al. |
| 2002/0138390 A1 | 9/2002 | May |
| 2002/0138398 A1 | 9/2002 | Kalin et al. |
| 2002/0156723 A1 | 10/2002 | Lilly et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194081 A1 | 12/2002 | Perkowski |
| 2002/0194096 A1 | 12/2002 | Falcone et al. |
| 2002/0195486 A1 | 12/2002 | Erb et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0018567 A1 | 1/2003 | Flitcroft et al. |
| 2003/0028481 A1 | 2/2003 | Flitcroft et al. |
| 2003/0037002 A1 | 2/2003 | Higgins et al. |
| 2003/0040959 A1 | 2/2003 | Fei et al. |

(56) References Cited

U.S. PATENT DOCUMENTS

| | | |
|---|---|---|
| 2003/0046218 A1 | 3/2003 | Albanese et al. |
| 2003/0055675 A1 | 3/2003 | Klein Twennaar |
| 2003/0061521 A1* | 3/2003 | Rosenbaum .................. 713/202 |
| 2003/0069780 A1 | 4/2003 | Hailwood et al. |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0163415 A1 | 8/2003 | Shanny et al. |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0218066 A1 | 11/2003 | Fernandes et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0049451 A1 | 3/2004 | Berardi |
| 2004/0049456 A1 | 3/2004 | Dreyer |
| 2004/0064409 A1 | 4/2004 | Kight et al. |
| 2004/0078328 A1 | 4/2004 | Talbert et al. |
| 2004/0094624 A1 | 5/2004 | Fernandes et al. |
| 2004/0133516 A1 | 7/2004 | Buchanan et al. |
| 2004/0149544 A1 | 8/2004 | Dal Ferro |
| 2004/0159070 A1 | 8/2004 | Khan et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1 | 3/2005 | Schmidtberg et al. |
| 2005/0069137 A1* | 3/2005 | Landrock ...................... 380/278 |
| 2005/0077349 A1 | 4/2005 | Bonalle et al. |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0116024 A1 | 6/2005 | Beenau et al. |
| 2005/0119969 A1 | 6/2005 | Michelsen et al. |
| 2005/0144059 A1 | 6/2005 | Schuessler |
| 2005/0171898 A1 | 8/2005 | Bishop |
| 2005/0177480 A1 | 8/2005 | Huang |
| 2005/0209954 A1 | 9/2005 | Asher et al. |
| 2005/0228751 A1 | 10/2005 | Keown et al. |
| 2005/0246268 A1* | 11/2005 | Foran et al. ...................... 705/39 |
| 2005/0261955 A1 | 11/2005 | Humble et al. |
| 2006/0036553 A1 | 2/2006 | Gupta et al. |
| 2006/0041540 A1 | 2/2006 | Shannon et al. |
| 2006/0069642 A1* | 3/2006 | Doran et al. ...................... 705/39 |
| 2006/0106650 A1 | 5/2006 | Bush |
| 2006/0106717 A1 | 5/2006 | Randle et al. |
| 2006/0136335 A1 | 6/2006 | Ferguson, III |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0191999 A1 | 8/2006 | Stoutenburg et al. |
| 2006/0206427 A1 | 9/2006 | Love et al. |
| 2006/0259390 A1 | 11/2006 | Rosenberger |
| 2006/0277144 A1 | 12/2006 | Ranzini et al. |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0138255 A1 | 6/2007 | Carreon et al. |
| 2007/0187484 A1 | 8/2007 | Cooper et al. |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0071674 A1* | 3/2008 | Thackston ...................... 705/38 |
| 2008/0103972 A1* | 5/2008 | Lanc ............................... 705/44 |
| 2008/0116283 A1 | 5/2008 | Newbrough et al. |
| 2008/0193008 A1 | 8/2008 | Mount et al. |
| 2008/0195541 A1 | 8/2008 | Battaglini et al. |
| 2008/0210752 A1 | 9/2008 | March |
| 2008/0215487 A1 | 9/2008 | Stoutenburg et al. |
| 2009/0043651 A1 | 2/2009 | Schwarz |
| 2009/0119190 A1* | 5/2009 | Realini ........................... 705/30 |
| 2009/0265272 A1 | 10/2009 | Dill et al. |
| 2010/0063928 A1* | 3/2010 | Hart ............................... 705/44 |
| 2010/0099380 A1* | 4/2010 | Chen .............................. 455/411 |
| 2011/0066550 A1* | 3/2011 | Shank et al. ..................... 705/43 |
| 2011/0238553 A1* | 9/2011 | Raj et al. ........................ 705/37 |
| 2012/0209731 A1* | 8/2012 | Conlin et al. ................... 705/16 |

FOREIGN PATENT DOCUMENTS

| | | |
|---|---|---|
| EP | 1014318 | 6/2000 |
| JP | 2001-266039 | 9/2001 |
| JP | 2002-024618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| JP | 2007-088822 | 4/2007 |
| WO | 91/16691 | 10/1991 |
| WO | 93/08545 | 4/1993 |
| WO | 94128497 | 12/1994 |
| WO | 96/08783 | 3/1996 |
| WO | 96/12242 | 4/1996 |
| WO | 97/14108 | 4/1997 |
| WO | 97/45796 | 12/1997 |
| WO | 97/45814 | 12/1997 |
| WO | 98/09260 | 3/1998 |
| WO | 99/10823 | 3/1999 |
| WO | 99/49404 | 9/1999 |
| WO | 00/18060 | 3/2000 |
| WO | 00/39979 | 7/2000 |
| WO | 01/75730 | 10/2001 |
| WO | 02/063432 | 8/2002 |
| WO | 2004/079603 | 9/2004 |

OTHER PUBLICATIONS

Andersen Consulting, Image-Based Transaction Processing: The Banking Industry's Challenge for the 1990s and Beyond (1989).

Andrew Gluck, Creating a global cash-management game plan, Bank Systems & Tech., Feb. 1997, at 28.

Andrew Reinbach, Chase steps up treasury system, Bank Systems & Tech., Nov. 1995, at 29.

Angela Maher & Jeffrey Troutman, PNC Bank Treasury Management, Payor's Prescription for Painless Migration to Receipt of Electronic Healthcare Payments and Remittance Advices (Dec. 2001).

Angela Maher & Jeffrey Troutman, PNC Bank Treasury Management, Provider's Prescription for Painless Migration to Receipt of Electronic Healthcare Payments and Remittance Advices (Dec. 2001).

Ann Keeton, Bank of America Completes Its Rollout of 'Paperless' Processing of Payments, Wall St. J., Nov. 1, 1999, at B13.

BancTec Selects Alchemy CD-Based Archival Solution for Remittance Processing System, Bus. Wire, May 6, 1998.

Bank of America Provides Nationwide Lockbox Services, Press Release, Oct. 20, 1999.

(56) References Cited

OTHER PUBLICATIONS

Bridget Malone, Internet Billing: Building a Secure Global Market, Electronic Commerce World, Jan. 2001, at 46.
Caere introduces the Model 1800 document remittance processor, Bus. Wire, Oct. 19, 1995.
CardFlash, Daily Payment Card News, Sep. 23, 2004.
CES/NaBanco introduces stored value card technology; Blockbuster Video is first merchant partner, Bus. Wire, Jan. 15, 1996.
Chapter Reports: Texas Chapter, Work Process Improvement Today, Apr. 1998.
Chase Image-Enables NY Wholesale Lockbox Facility with VICOR Technology, Press Release, Aug. 31, 1999.
Chase Manhattan introduces new FEDI payables product, Cash Mgmt. News, May 1995.
Chase offers image lockbox for Europe, Bank Systems & Tech., Aug. 1997, at 37.
Chasing the Global Trend, Cash Mgmt. News, Dec. 1995, at 8.
Christy Tauhert, Lock Box Solutions Reengineer Payment, Insurance & Tech., Aug. 1996, at 22.
Cindy Jensen, U.S. Bank Effectively Manages Complexity, Today, May/Jun. 2006.
Council for Electronic Billing and Payment, Business-to-Business EIPP: Presentment Models and Payment Options Part One (Jan. 2001).
Council for Electronic Billing and Payment, Business-to-Business EIPP: Presentment Models and Payment Options Part Two (Jan. 2001).
Crestar to Introduce New Advanced Cash Management System Based on IA Corp. Software, Bus. Wire, Oct. 28, 1996.
Dieter Wackerow, MQSeries Enterprise Application Integration Center, MQ Series Primer, Oct. 1999.
DMP and IMR Partner to Develop Electronic Archiving Solution for Wholesale Lockboxes and Remittance Processing, Bus. Wire, Mar. 24, 1998.
Douglas Armstrong, Norwest eases difficulty of interstate banking Bank's customers may use the same account No. at any branch, Milwaukee J. Sentinel, Oct. 12, 1995, at 2.
Du Pont's Electronic Payments System, Corporate EFT Report, Jan. 11, 1989.
Elena Malykhina, Cell Phone Software Formats Check for Online Banking, InformationWeek, Jan. 24, 2008.
Erica Goode, On Profit, Loss and the Mysteries of the Mind, N.Y. Times, Nov. 5, 2002.
Fidelity Helps Fund Sellers Trim the Taxes They'll Owe, Wall St. J., Nov. 7, 2002.
First Data markets stored-value cards, Cards Int'l, Jan. 30, 1996, at 5.
Frank J. Derfler, Jr. & Les Freed, How Networks Work 144-51 (2003).
Get ready for electronic commerce, ABA Banking J., Jun. 1995, at 47.
Gordon Platt, Online billing & payments: Technology Providers Multiply, Global Fin., Apr. 1, 2001.
Gregory Zuckerman, The Hedge-Fund Craze, Wall St. J., Jun. 12, 2002.
Henry Urrows & Elizabeth Urrows, Automated imaging in financial services, 11 Document Image Automation 259 (Sep.-Oct. 1991).
IA announced installation at QuestPoint of first client/server cash management system with check image storage compatible with IBM, NCR and Unisys, Bus. Wire, May 29, 1997.
IA Corp. Announces New CheckVision Products, Bus. Wire, Apr. 1, 1996.
IA Corp. shows complex transaction processing software WorkVision at AIIM, Bus. Wire, Apr. 14, 1997.
IA Corp. Wins Contract With Comercia to Install the First Digital All Items Archive, Bus. Wire, Jan. 9, 1997.
IA Corporation Becomes a Major Player in Image-Based Cash Management Solutions, Bus. Wire, Nov. 24, 1995.
IA Presents New Advanced Cash Management Software at TMA to Link Banks and Their Corporate Customers, Bus. Wire, Nov. 18, 1996.
Ian McDonald, The Stars in the Sky Flicker, and Fund Stars Do the Same, Wall St. J., Jan. 15, 2003.
IA's RemitVision adapted by Harris Bank for CD-ROM and Online Customer Viewing of Check and Remittance Documents, Bus. Wire, May 28, 1996.
In Brief: Wachovia-InteliData Deal, Am. Banker, May 7, 2002.
Initial Launch to 200 Credit Unions, USA Today, Jun. 27, 2002.
Intelidata Technologies Corporation, Form 10-K for fiscal year ended Dec. 31, 2001.
J.D. Carreker, Electronic Check Presentment: Capturing new technology, Banking Mgmt., Mar./Apr. 1995, at 32.
J.P. Buckley et al., Processing noisy structured textual data using a fuzzy matching approach: application to postal address errors, 4 Soft Computing 195 (2000).
Jeetu Patel & Joe Fenner, E-Billing Moves Into B2B, Imaging & Document Solutions, Jan. 2001, at p. 44.
Jeetu Patel, B-to-B E-Billing Heats Up—Business-to-business electronic billing is more complex than the business-to-consumer model, but the potential payoffs are bigger, InformationWeek, Oct. 23, 2000.
John C. Bogle, Founder and Former Chairman, The Vanguard Group, Remarks to the '40 Act Institute of Practising Law Institute: Mutual Funds at the Millennium—Fund Directors and Fund Myths (May 15, 2000).
John Shannon, New lockbox platform due out at NationsBank, Bank Systems & Tech., Feb. 1998, at 38.
Jonathan Clements, Harsh Truth: Your Investments Likely Won't Make Any Money, Wall St. J., Nov. 27, 2002.
Keith Lamond, Credit Card Transactions Real World and Online, available at, http:/www.virtualschool.edu/mon/ElectronicProperty/klamond/credit_card.htm (last visited Jul. 8, 2005).
Kristen French, Investors Worry CheckFree Being Chased from its Own Game, TheStreet.com, Jun. 20, 2001.
Liz Moyer, Bank of Montreal to Install Imaging System by Unisys for Retail Lockbox Services, Am. Banker, Oct. 22, 1996, at 19.
Liz Moyer, KeyCorp Joins Trend to Check Imaging Lockbox, Am. Banker, Aug. 23, 1996.
M. Williams, FRIIS, Goodbye to paper?, ABA Banking J., Mar. 1989, at 61.
Mark Arend, Bank applications fuel optical storage market, ABA Banking J., Oct. 1991, at 77.
Melinda Norris, First Data Unit Develops Blockbuster Cash Card, Omaha World Herald, Jan. 19, 1996, at 16.
NationsBank rolls out first wholesale lockbox imaging, Potomac, Aug. 3, 1995, at 1.
NCR introduces 7780 item processing system, Bus. Wire, Mar. 11, 1992.
Newsbyte, Visa & Carnegie Mellon Plan Online Payment Scheme, 1995 WL 2205732, Feb. 15, 1995.
Nokia Announces the World's First NFC Enabled Mobile Product for Contactless Payment and Ticketing, PR Newswire, Feb. 9, 2005.
Offer: Book Yourself Free Cassettes, Birmingham Post, Mar. 25, 2000, at 16.
Operating in a multi-currency environment, Aslamoney, Oct. 1995, at 6.
Patricia A. Murphy, E-Billing: New Age Electronic Data; Interchange or Something Better?, Bank Tech. News, Jul. 2000, at 43.
Paul Williams, IBM UK Laboratories Ltd., IBM MQSeries Commercial Messaging, ACM SIGICE Bulletin, Apr. 1995.
Payment Data Systems files patent on debit card payment solution, Am. City Business J., Mar. 5, 2004.
PNC Bank Add Chicago to National Lockbox Network, PR Newswire, Nov. 5, 1997.
Priya Malhotra, Clearing House Enumerates e-Payment Ills, Am Banker, Aug. 13, 2002.
Richard J. Maturi, Personal Finance; When you need to send cash in a flash, N.Y. Times, Sep. 25, 1988, at A7.
Robert M. Hunt, Federal Reserve Bank of Philadelphia, Working Paper No. 03-10: An Introduction to the Economics of Payment Card Networks (Jun. 2003).
Robert M. Hunt, An Introduction to the Economics of Payment Card Networks, Rev. Network Econ., Jun. 2003, at 80.
Scott Leibs, Internet Billing Gets Its Due, CFO, Feb. 1, 2001, at 30.

(56) References Cited

OTHER PUBLICATIONS

Shawmut Bank Provides Lockbox Customers Real-Time, On-Line Electronic Exception Processing, Bus. Wire, Jan. 9, 1996.
Sherree DeCovney, Net scope, Banking Tech., May 1997, at 28.
Simultaneous Image Capture, Bank News, Oct. 1996, at 10.
State of Minnesota using AT&T imaging solution to reengineer sales tax paying process, Bus. Wire, Apr. 18, 1994.
Stephen M. Matyas, Digital Signatures—An Overview, 3 Computer Networks 87 (1979).
Steve Bills, Chase Pact Done, What's Next for Web Vendors?, Am. Banker, Jun. 3, 2002, at 23.
Steve Forbes, Fact and Comment, Forbes, Sep. 30, 2002, at 33.
Steven Marjanovic, Corporate Services: Chase Gears Up Global Payments System Series: 16, Am. Banker, Sep. 11, 1995, at 41.
Steven Marjanovic, NationsBank offers lockbox imaging, Am. Banker, Jul. 3, 1995, at 20.
Systems spell change for foreign exchange, Global Investor, Nov. 1996, at 18.
Terrie Miller & Henry Yan, When custody governs, Benefits Canada, Feb. 1998, at 33.
The payments system gets a new image, ABA Banking J., Mar. 1990, at 84.
Thomas P. Fitch, Image Technology brings lockbox breakthroughs, Corp. Cashflow Magazine, Sep. 1995, at 16.
U.S. Appl. No. 60/133,577, filed May 11, 1999.
Valerie Block, Blockbuster Running Test of a Stored Value Card, Am. Banker, Sep. 1, 1995.
Wausau Financial Systems' ImageRPS and OPEX interface a perfect math, Work Process Improvement Today, Dec. 1997.
Wells Fargo Rolls out Nationwide Lockbox Check Conversion, PR Newswire, Apr. 22, 2003.
Wendy S. Mead, Two Banks' Imaging Deals Target Fee Revenue Increases, Am. Banker, May 9, 1997, at 11.
Wholesale lockbox imaging, ABA Banking J., Feb. 1, 1993.

* cited by examiner

A transaction fee of $ 2.50 will be assessed for this transaction. Do you agree to accept this fee?

YES

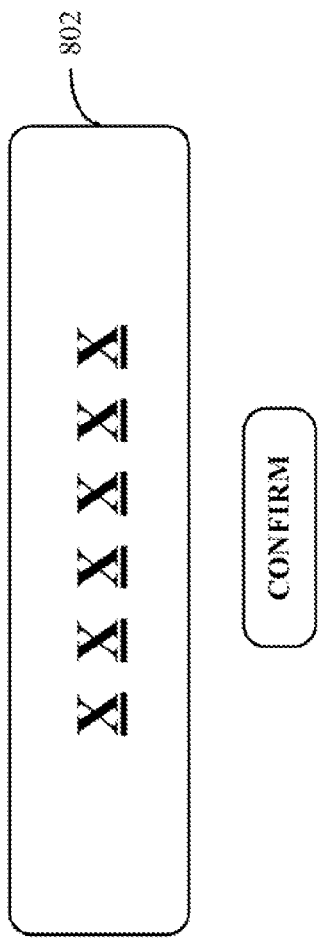

Please enter your security code as follows . . .

First enter the 7-digit code provided to you by Sender followed by the 5-digit code provided directly to you by Bank.

XXXXXXX - XXXXX

CONFIRM

FIG. 9A

Please enter your security code as follows . . .

First enter the 5-digit code provided directly to you by Bank followed by the 7-digit code provided to you by Sender.

XXXXX-XXXXXXX

CONFIRM

Please enter your security code as follows . . .

This transaction requires you to enter the LAST 4 digits of the 7-digit code provided to you by Sender followed by the FIRST 3 digits of the 5-digit code provided directly to you by Bank.

X X X X X X X

CONFIRM

You have been sent $100.

You have until May 30, 2010 to withdraw your cash.

Would you like to withdraw your cash now?

NO   YES

SYSTEM AND METHOD FOR ELECTRONIC REMITTANCE OF FUNDS

BACKGROUND OF THE INVENTION

1. Field of the Invention

The present invention relates generally to fund transfer and payment mechanisms. More particularly, the invention described herein is directed to a system and method for enabling the remittance of funds from a source account to a designated recipient.

2. Description of Related Art

Financial institutions have invested, and continue to invest, significant time and resources in the area of electronic banking, providing individuals and organizations alike with enormous flexibility in managing finances. Much of the growth in this area can be attributed to various technological advancements made over the years, with the most noticeable area of growth and development concentrated on providing greater conveniences and accessibility to banking customers. Inarguably the most recognizable of these technological advancements is seen in the vast network and interconnectability of automated teller machines (ATMs) and, with the prevalent use of the Internet, online banking. The use of ATMs and online banking is ubiquitous and underlies the financial services industry today, providing customers with the desired ease and reliability they demand when engaged in a variety of financial transactions, particularly at times when financial institutions are not available to service those needs.

Despite the widespread accessibility of ATMs and the dominant use of online banking to conduct financial transactions, the ability to leverage these two mechanisms to provide customers with advanced banking services has yet to be fully realized. Online banking customers, for instance, have the ability to conduct a wide array of financial transactions associated with their accounts. However, one such transaction that is not easily accessible to online banking customers is the ability to allocate funds in their account for purposes of making the allocated funds available to a designated recipient for cash withdrawal at an ATM. Typically, financial services of this type require involvement of a third-party to mediate the transaction. These types of services, which are well known in the art, are inconvenient and error-prone due to the need for third-party involvement. In view of the technological advancements available to banking customers today there is an expectation that antiquated fund remittance methods, such as the mediation of fund remittance between interested parties, are next in the evolution cycle.

Accordingly, there exists a need to enable an independent and near real-time fund remittance transaction process between an originating sending entity and a designated receiving entity, wherein such fund remittance transactions may be completed, for instance, via cash withdrawal from existing ATM networks.

SUMMARY OF THE INVENTION

It is an object of the invention disclosed herein to provide a convenient and improved fund remittance process that enables interested parties, particularly the sending and receiving entities, to directly conduct near real-time payment transactions.

It is a further object of this invention to provide a fund remittance process by which retrieval of a scheduled payment transaction can be realized through an automatic teller machine (ATM), or a similarly secured self-service machine.

It is another object of the present invention to provide a fund remittance process in which multiple security measures, and corresponding communication of the same, are provided for conducting near real-time payment transaction securely.

The fund remittance process of the present invention enables a sending entity having a source account at a financial institution to schedule a payment transaction for withdrawal by a designated receiving entity. A plurality of security codes are automatically generated upon processing a request to schedule a payment, wherein a first security code is communicated directly to the sending entity and a second security code is communicated directly to the designated receiving entity. The designated receiving entity may submit a request to retrieve the scheduled payment at a qualifying self-service machine. In interacting with the self service machine, security measures are deployed to execute one of a plurality of security code combination schemes in association with the first and second security codes. Upon validation, allocated funds associated with the scheduled payment are made available to the designated receiving entity for withdrawal

BRIEF DESCRIPTION OF THE DRAWINGS

The identified and other objects and advantages of the present invention will become apparent upon consideration of the following detailed description, taken in conjunction with the accompanying drawings, in which like reference characters refer to like parts throughout, and wherein:

FIG. 6 is an illustrative display of a transaction fee screen provided to a user engaging with a self-service machine in accordance with preferred embodiments of the present invention;

FIGS. 8A-8B are illustrative displays of security code entry screens presented to a user engaging with a self-service machine, the screens prompting the user for partial entry of two disparate codes for accessing a corresponding scheduled payment of funds, in accordance with preferred embodiments of the present invention;

FIGS. 9A-9C are illustrative displays of security code entry screens presented to a user engaging with a self-service machine, the screens of FIGS. 9A-9B prompting the user for a single-string ordered entry and the screen of FIG. 9C prompting for a single-string partial ordered entry of two disparate codes for accessing a scheduled payment of funds, in accordance with preferred embodiments of the present invention; and FIG. 10 is an illustrative display of a payment withdrawal screen provided to a user engaging with a self-service machine in accordance with preferred embodiments of the present invention.

DETAILED DESCRIPTION OF THE PREFERRED EMBODIMENTS

The present invention is described hereinafter with reference to the accompanying drawings. Embodiments described herein are provided to fully convey the novelties of the present invention and are not intended to limit the scope, applicability or configuration of the same. It will be apparent to one skilled in the art that alternate embodiments may be practiced without departing from the spirit and scope of the invention set forth in the appended claims.

Figure 1:
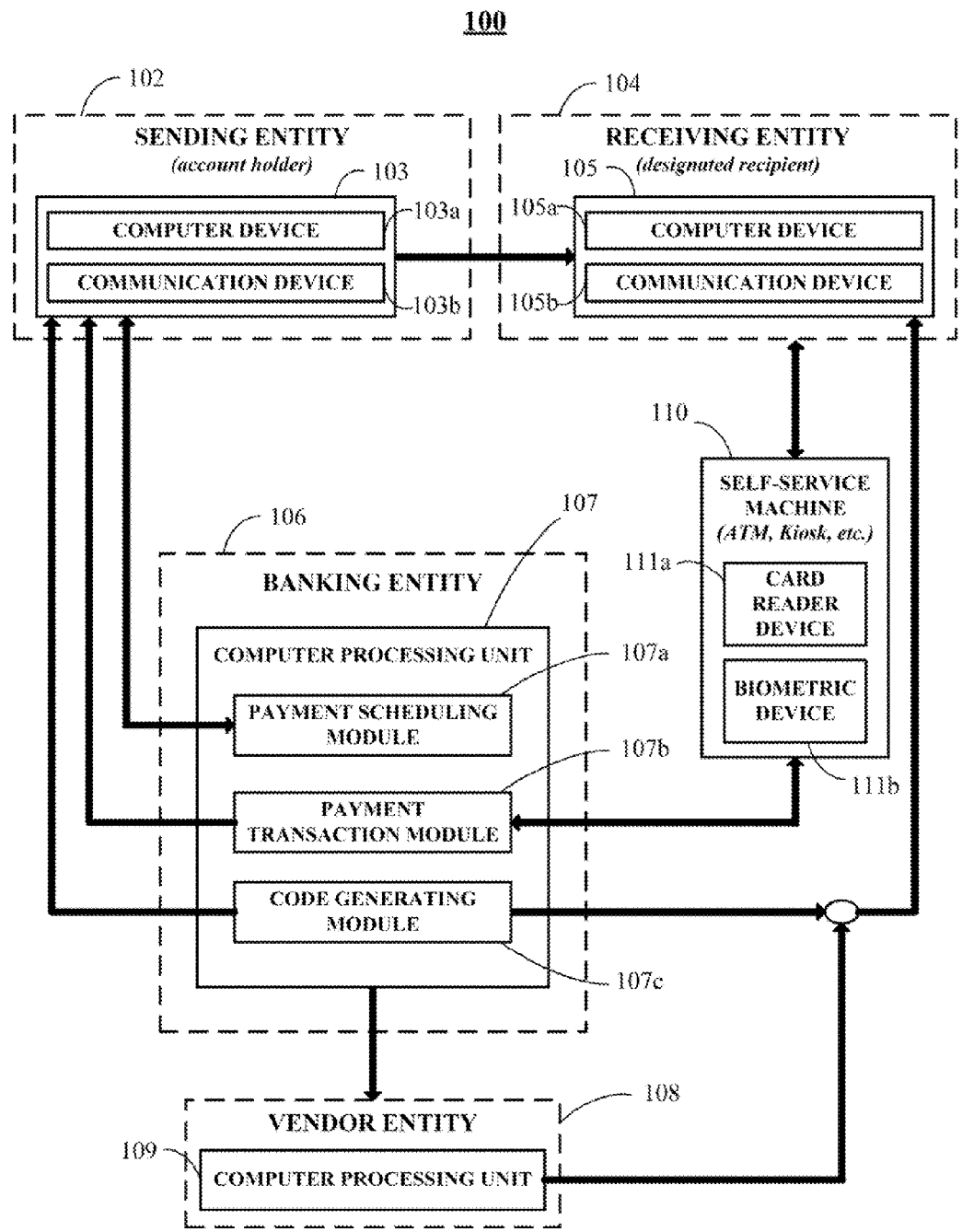
FIG. 1 is a block diagram illustrating an exemplary system for enabling a fund remittance process in accordance with preferred embodiments of the present invention.

The present invention is directed to an innovative system and method for enabling a remittance of funds from a source account to a designated recipient. An exemplary system 100 is provided, as illustrated in FIG. 1, for enabling a fund remittance process in accordance with preferred embodiments of the present invention. For purposes of clarity, and not by way of limitation, an illustrative network of computer processing modules and communication devices are arranged in exemplary system 100. System 100 may be comprised of more or less of the same components or, alternatively, entirely different components comprised of various modules, devices, systems or a combination thereof for achieving the functionalities and advantages presented by the fund remittance process described herein.

System 100 is comprised of computing and communication-enabled elements grouped in association with a plurality of entities, each of which is employed in one or more phases of the fund remittance process practiced by the present invention. In exemplary system 100, such entities may include a sending entity 102, a receiving entity 104, a banking entity 106 and a vendor entity 108. Although only one of each entity grouping is illustrated in system 100, in practice the interaction of multiple entities in varying arrangements and combinations can be envisioned and are well within the scope of the present invention. For example, system 100 could be modified to accommodate one or more vendor entities 108 in support of processes designated to banking entity 106 or, alternatively, interaction by vendor entity 108 can be eliminated entirely.

Sending entity 102 is representative of an account holder having access to a plurality of user devices 103. An account holder may be an individual or an organization having an established account (e.g., a checking or savings account) associated with a financial institution, wherein the established account may serve as a source of monetary funds for the fund remittance process described herein. In the present invention, the fund remittance process may be initiated upon receiving a request for scheduling a payment. A request for scheduling a payment may be a user-initiated action or preset as an automated action to be executed at a future date in time. User devices 103 are configured to provide an authorized account holder with access to processes for scheduling a payment. User devices 103 may be comprised of, but are certainly not limited to, a computer device 103a or a communication device 103b. In many instances, particularly with modern day developments in smartphone technologies and the like, computer device 103a and communication device 103b may be one in the same device. For example, user device 103 may be a mobile device having call and web access capabilities (i.e., voice and data enabled).

Receiving entity 104 is representative of a designated recipient that is identified by sending entity 102 for retrieving a scheduled payment of funds. The designated recipient may be an individual or organization that also has an established account associated with the same financial institution as that of sending entity 102. Alternatively, the designated recipient may have no established affiliation whatsoever with the financial institution associated with the established account of sending entity 102. Similar to sending entity 102, representative entity 104 may have access to a plurality of user devices 105. User devices 105 may be comprised of a computer device 105a and a communication device 105b or, as previously described, user device 105 may be a combination of devices provided call and web access capabilities. The process by which a scheduled payment of funds is retrieved by the designated recipient may rely at least partially on information relayed from at least one of user devices 103 to at least one of user devices 105.

The term "computer device", as used herein, is not limited to any one particular type of hardware device. A computer device may be any type of device enabled to process data, such as a desktop computer, a laptop computer, a kiosk terminal, a personal digital assistant (PDA) or any equivalents or combinations thereof. Any device or part of a device configured to process, manage or transmit data, whether implemented with electrical, magnetic, optical, biological components or otherwise, may be made suitable for implementing the invention described herein. Similarly, the term "communication device", as used herein, is not limited to any one particular type of hardware device, but may be any device enabled for communication with an established network such as, for example, a local area network, a wide area network, a telephone network, a cable television network, an intranet, the Internet, or any other suitable wired or wireless communications network. Suitable wireless communications networks may be the global system for mobile communications (GSM), time-division multiple access (TDMA), code-division multiple access (CDMA), Bluetooth, or any other suitable wireless communication networks.

User devices 103 and 105 may establish communications with one or more remote sites, which may be tasked with processing requests and executing instructions for enabling the fund remittance process described herein, over one or more communication networks using any suitable protocol or protocol stack. For example, establishing communications with one or more remote sites may be realized via a transmission control protocol/Internet protocol (TCP/IP) environment. Any suitable request-response type of protocol and socket-based packet transport stack, or suitable peer-to-peer communications approach may be used.

The one or more remote sites may include one or more servers such as, for example, a database server and a web server. Alternatively, database and web servers may not be segregated at all, but rather all necessary applications and functions of the fund remittance process described herein may reside on a single server. Servers may be coupled to various onsite databases, or remote databases via a communications network, for storing and retrieving data. For example, encrypted data relating to transaction requests associated with the fund remittance process described herein may be kept and accessed from the foregoing databases. Alternatively, one or more mirrored servers may be provided as a backup for holding current databases and updated web applications. In other suitable approaches, such as in non-Internet based approaches, a remote site may include an application server or any other suitable server or combination of servers. The term "server", as used herein, is not limited to a distinct piece of computing hardware or storage component, but may also be a software application or a combination of hardware and software.

Banking entity 106 is representative of a financial institution that maintains the established account associated with sending entity 102. In a preferred embodiment, banking entity 106 is an intermediary actor regulating the fund remittance process described herein between sending entity 102 and receiving entity 104. To enable the fund remittance process, banking entity 106 may be configured with one or more computer processing units 107. Computer processing unit 107 may include a plurality of computer programmed processes directed at managing various aspects and stages of the fund remittance process. For example, computer processing unit 107 may be comprised of, but is certainly not limited to, a payment scheduling module 107a, a payment transaction module 107b and a code generating module 107c.

Computer processing unit 107 may reside on and be deployed through a wide variety of computing devices and platforms. Such devices and platforms may include a special purpose computer, a computer system including a microcomputer, a mini-computer or mainframe for example, a programmed microprocessor, a micro-controller, a peripheral integrated circuit element, a CSIC (Consumer Specific Integrated Circuit) or ASIC (Application Specific Integrated Circuit) or another suitable integrated circuit, a logic circuit, a digital signal processor, a programmable logic device such as a FPGA, PLD, PLA or PAL, or any other device or arrangement of devices that is capable of implementing the steps deployed for enabling the fund remittance process described herein.

Instructions associated with the fund remittance process described herein may be presented in one or more programs that are executable, for example, by computer processing unit 107. Software packages may also be provided, wherein a collection of separate programs, a program module within a larger program, a portion of a program module or any other conceivable combinations thereof is presented. The software used might also include modular programming in the form of object oriented programming, wherein the software provides instructions to computer processing unit 107 for how to handle a particular set of data to be processed.

Payment scheduling module 107a may be configured to handle all aspects of scheduling a payment in connection with the fund remittance process described herein. As previously described, a request for scheduling a payment may be initiated via user device 103 of sending entity 102. An online or mobile application may be provided on user device 103 to prompt for certain information required to schedule a payment. Such information may include, for example, designation of a source account for withdrawal of funds, a payment amount to be scheduled for withdrawal from the designated source account, recipient information and any other information that may be required to verify and authorize the remittance of funds from the designated source account of sending entity 102 to a qualifying fund dispensing mechanism utilized by receiving entity 104.

When the request for scheduling a payment is transmitted by user device 103 of sending entity 102 and received at computer processing unit 107 of banking entity 106, payment scheduling module 107a may be tasked with processing the information received. Processing the information may include communicating instructions for certain actions to be performed by one or more associated modules coupled to computer processing unit 107. For example, upon receiving the request for scheduling a payment from user device 103 of sending entity 102, module 107a may be configured to communicate the request to a code generating module 107c.

Code generating module 107c may be configured to generate confirmation notifications and security codes relating to a fund remittance transaction. For instance, in response to receiving the request for scheduling a payment, module 107c may transmit a notification confirming receipt of the request, along with a security code assigned to the fund remittance transaction, back to user device 103 of sending entity 102. Code generating module 107c may also transmit a second notification informing a designated recipient of the scheduled payment, along with a second security code assigned to the fund remittance transaction, to user device 105 of receiving entity 104. In a preferred embodiment, upon successfully processing a request for scheduling a payment, a first security code is transmitted to user device 103 of sending entity 102 and a second security code is transmitted to user device 105 of receiving entity 104. Various embodiments for employing the use of such codes are described in conjunction with the process flows illustrated in FIGS. 2A-2B and FIGS. 3A-3D.

In an alternate embodiment, the computer programmed processes managed by code generating module 107c may be delegated partially or entirely to a vendor entity 108. For example, banking entity 106 may retain the services of an independent organization for performing particular tasks associated with the fund remittance process described herein. Vendor entity 108 may have a computer processing unit 109. Computer processing unit 109 may be coupled, directly or indirectly, to module 107a of banking entity 106 for receiving instructions relating to a request for scheduling a payment made by sending entity 102. Upon receiving instructions relating to the request from module 107a, computer processing unit 109 may transmit a first security code to user device 103 of sending entity 102 and a second security code to user device 105 of receiving entity 104. In another embodiment, module 107a of banking entity 106 may transmit the first security code to user device 103 of sending entity 102, and computer processing unit 109 may transmit the second security code to user device 105 of receiving entity 104.

Regardless of the code generating embodiment employed, security code records may be made accessible to payment transaction module 107b of banking entity 106 in order to verify actions taken in connection with actual remittance of designated funds. Payment transaction module 107b may be configured to handle all aspects of a request for withdrawing a scheduled payment of funds. The request for withdrawing funds is invoked by receiving entity 104 and may be initiated, for example, through the use of self-service machine 110. Self-service machine 110 may be an automatic teller machine (ATM), a proprietary vending machine, a kiosk or any other suitable means for providing secure automated interactions and dispensing of funds to a user.

Self-service machine 110 of FIG. 1 may be comprised of a card reader device 111a and a biometric device 111b. Card reader device 111a and biometric device 111b may be used to identify a user interacting with self-service machine 110. Card reader device 111a may be configured to be operable, for example, with a smart card (also known as an integrated circuit card or chip card), a magnetic strip card and similarly known variations thereof. Biometric device 111b may be any one of a number of devices configured for recognizing a human physiological trait—e.g., an image or pattern scanning device for analyzing fingerprints, facial features, iris patterns or any other unique physiological trait. Additionally, banking entity 106 may have access to one or more databases (not shown) storing customer and non-customer profiles. User identification data received at self-service machine 110, whether via card reader device 111a, biometric device 111b or a combination thereof, may be matched against stored profile information for ascertaining the identity of a user interacting with self-service machine 110.

In yet another embodiment, electronic passports (i.e., passports having a contactless integrated circuit chip embedded in its cover) in conjunction with wireless detection technology, such as radio frequency identification (RFID), may be employed for user verification purposes at self-service machine 110. To enable the foregoing self-service machine 110 could be configured, for example, with an interrogator (i.e., an RFID reader) to obtain user information stored on the chip embedded in the passport. This and other alternate configurations of self-service machine 110 are envisioned and, as such, the implementation of the fund remittance process of the present invention is not limited solely to the foregoing described arrangements. Rather, self-service machine 110 of FIG. 1 is provided merely for illustrative purposes and may be equipped with additional means for verifying the identity of a user.

Figure 2A:
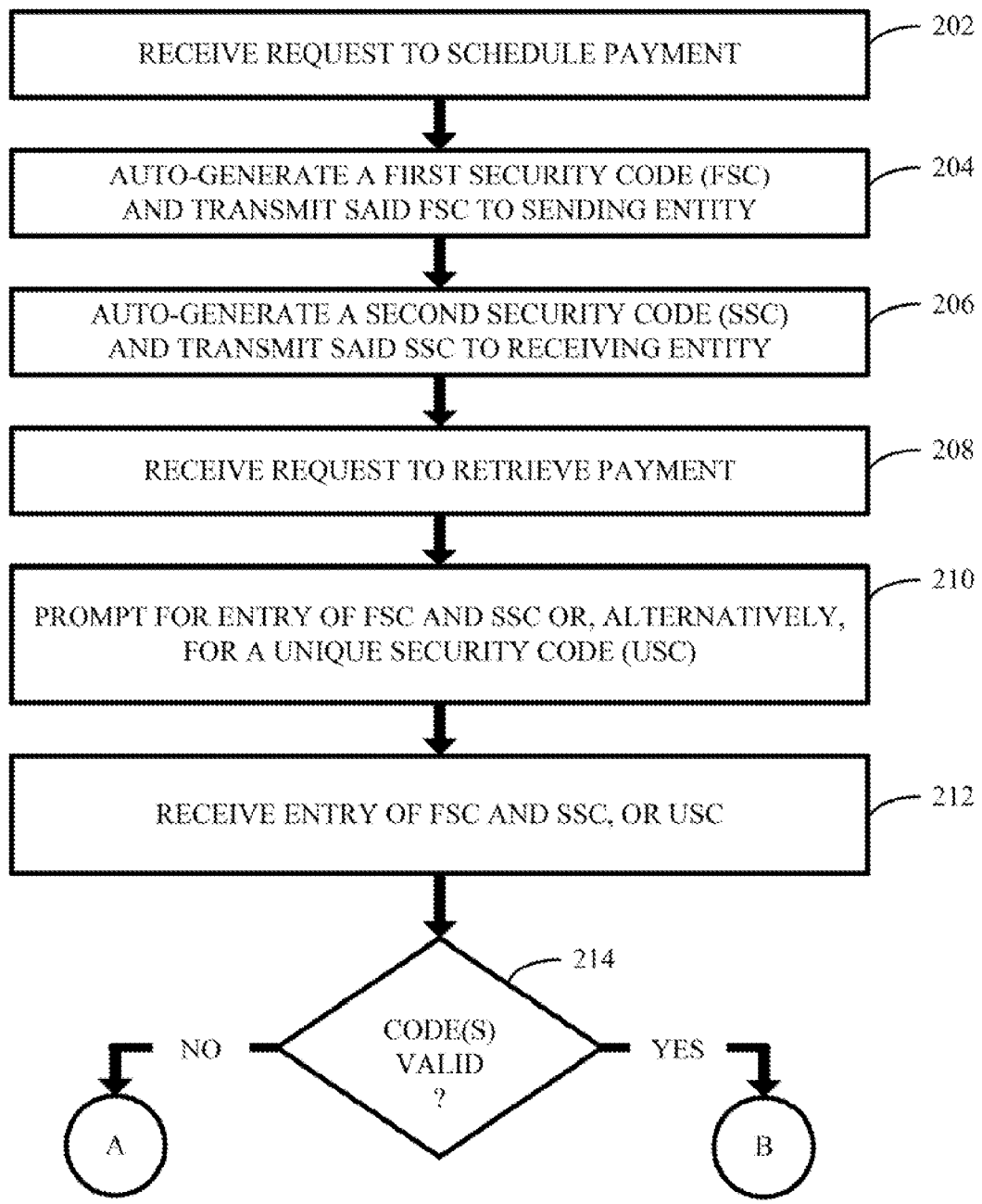
FIGS. 2A-2B are flowcharts illustrating an overview of steps performed by the fund remittance process in accordance with preferred embodiments of the present invention.
Figure 2B:
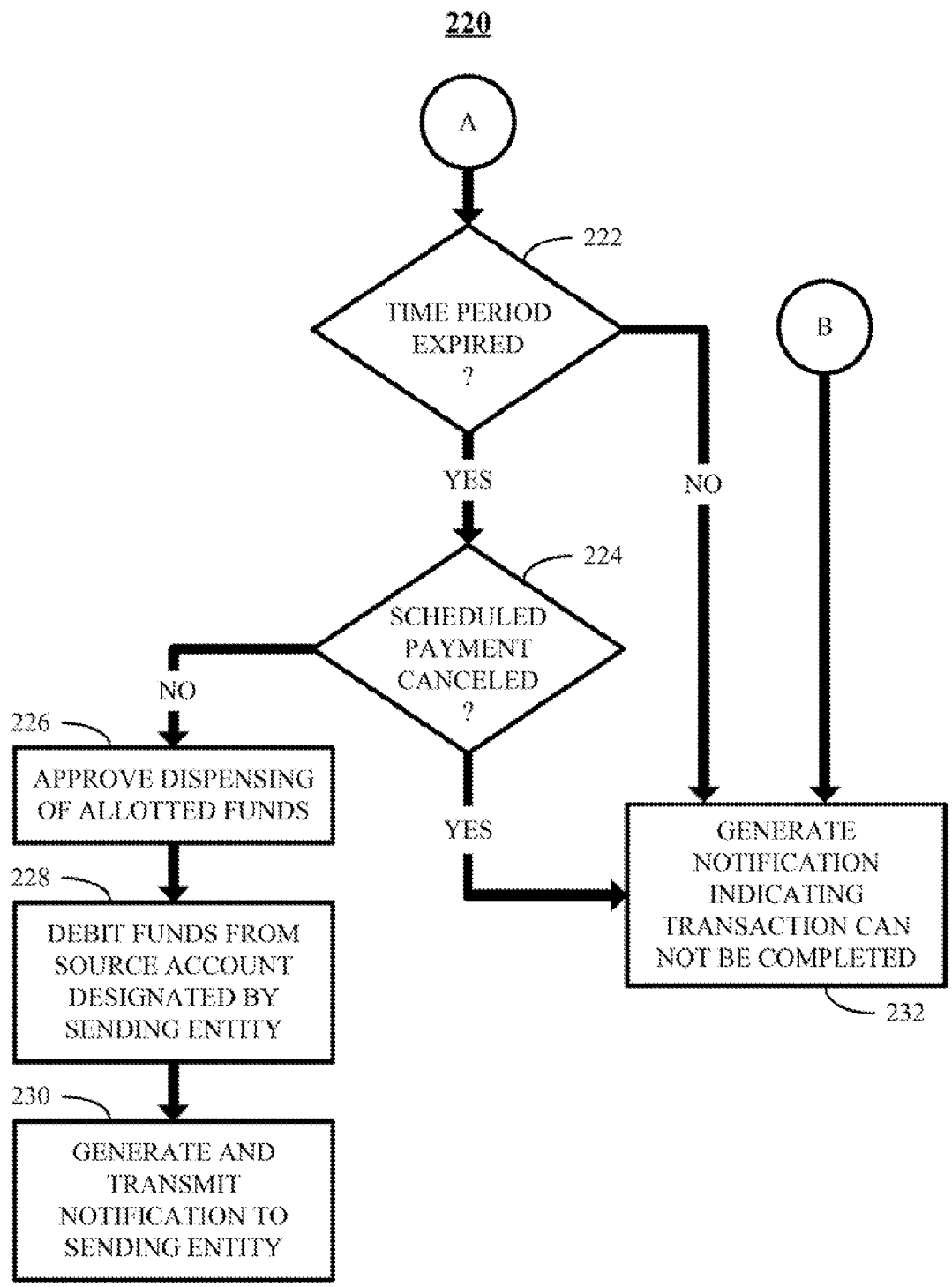

An overview of the steps employed in the fund remittance process of the present invention is embodied in the flowcharts illustrated in FIGS. 2A and 2B. In FIG. 2A, a process flow 200 may be deployed upon initiating a request for scheduling a payment. The request may be received, at step 202, from a user device 103 of sending entity 102. The request may include information needed for scheduling the payment, such as designation of a source account for withdrawal of funds, a payment amount to be scheduled for withdrawal from the designated source account and recipient information. Recipient information preferably includes a recipient's name, home address, mobile phone number and e-mail address. The request for scheduling a payment, upon submission, may be received at a host computer associated, for example, with banking entity 106 for processing by payment scheduling module 107a.

Upon confirming, at payment scheduling module 107a, that required information for scheduling a payment has been provided, code generating module 107c may then receive an indication confirming the same to initiate the process associated with generating security codes needed for transacting the scheduled payment. More specifically, code generating module 107c may be configured to auto-generate a first security code (FSC), at step 204, and a second security code (SSC), at step 206, for communicating the same, respectively, to sending entity 102 and receiving entity 104. Upon receiving the FSC at user device 103 of sending entity 102, sending entity may then be instructed to communication the FSC to receiving entity 104. Instructions for doing so may be included with transmission of the FSC to user device 103. The SSC, on the other hand, is communicated directly to receiving entity 104. The FSC and the SSC may be communicated to receiving entity 104 via one or more user devices 105.

Once receiving entity 104 has received both the FSC and the SSC, a request to retrieve the scheduled payment may then be initiated to continue the fund remittance process. At step 208, a request to retrieve the scheduled payment may be received. The request may be initiated on self-service machine 110, which may be coupled to payment transaction module 107b of banking entity 106. Upon receiving the request, payment transaction module 107b may then be configured to transmit instructions to self-service machine 110 to present a prompt, at step 210, requesting entry of the FSC and SSC provided to receiving entity 104. Alternatively, a prompt for a unique security code (USC), which may be comprised partially from both the FSC and the SSC, may be presented to receiving entity 104 transacting with self-service machine 110. A prompt for entry of the USC, for example, may be accompanied by instructions communicated via a transaction screen of self-service machine 110, the instructions providing guidance for determining the USC using the FSC and the SSC in possession of receiving entity 104. The instructions accompanying the prompt for the USC may be either static or randomly generated instructions for determining the USC. In an effort to provide enhanced security measures, the FSC and the SSC may be employed in various combinations, some of which will be described in conjunction with the process flows provided in FIGS. 3A-3D and the illustrative display screens of FIGS. 7A-9B, to enable the fund remittance process described herein.

After entry of the FSC and SSC, or the USC, is received, at step 212, payment transaction module 107b of banking entity 106 may then make a determination, at step 214, whether or not code entries received are valid. If one or more code entries can not be verified, then a notification may be generated, at step 232, indicating that the transaction can not be completed. If a determination is made that the code entries received are valid, then the request to retrieve the scheduled payment may proceed to additional conditional inquiries, at steps 222 and 224, to verify that a time period associated with the scheduled payment has not expired and, if satisfied, to further determine whether the scheduled payment has otherwise been canceled by sending entity 102, or in some instances banking entity 106, prior to expiration of the allotted time period for conducting the transaction. If a determination is made that the time period associated with the scheduled payment has expired or been canceled, then a similar notification may be generated, at step 232, indicating the transaction can not be completed or the time period has expired.

Upon validating, at step 212, the code entries received and affirming, at steps 222 and 224, that the related transaction is still active, the request to retrieve the scheduled payment received at self-service machine 110 may be approved by payment transaction module 107b and corresponding allotted funds are made available to receiving entity 104 for dispensing, at step 226. When funds have been approved for dispensing and receiving entity 104 requests withdrawal of the approved funds, the funds may then be debited, at step 228, from the source account designated by sending entity 102 during scheduling of the payment. Notifications associated with debiting of funds from the designated source account may be generated, at step 230, and transmitted to user device 103 of sending entity 102 to confirm activity associated with or completion of the transaction.

Multiple code entry embodiments may be deployed in conjunction with the fund remittance process of the present invention. These embodiments are described with reference to the flowcharts illustrated in FIGS. 3A-3D. Whether interacting in a transaction as sending entity 102 or receiving entity 104, the fund remittance process described herein may be configured to require input of identification criteria to identify the transacting entity and insure secure transactions are processed. For example, in process flow 300 of FIG. 3A, the fund remittance process may be enabled, at step 302, by use of a credit or banking card having a corresponding pin number associated therewith. However, as previously described, the present invention is not limited to the use of cards, and alternate forms of user identification may be substituted in place thereof. After identification information is validated, at step 304, a determination is made, at step 306, whether the transacting entity is submitting a request for scheduling a payment or a request for retrieving a scheduled payment. If the transacting entity is sending entity 102, then an option to schedule a payment may be selected. If the transacting entity is receiving entity 104, then an option to retrieve a scheduled payment may be selected.

Predefined computer prompts may be provided, at steps 308 and 310, under the direction of payment scheduling module 107a of banking entity 106 when a determination is made, at step 306, that the option to schedule a payment has been selected. Prompts may solicit, at step 308, information pertaining to a designated recipient's name, home address, mobile phone number and e-mail address. Prompts may also solicit, at step 310, information pertaining to a monetary amount to be made available for withdrawal by the designated recipient, and a designation of a source account associated with sending entity 102 for debiting the monetary amount upon receiving a withdrawal request from receiving entity 104. Upon confirming successful scheduling of a payment, as previously described, code generating module 107c may then generate, at step 312, the first security code (FSC) and the second security code (SSC) for transmitting the same, at step 314, to sending entity 102 and receiving entity 104, respectively.

When buyer entity 104 has acquired the FSC and the SSC, a request to retrieve the scheduled payment may then be made. Again, after identification criteria is received, at step 302, and validated, at step 304, a determination may be made, at step 306, that the option to retrieve a scheduled payment has been selected. As previously suggested, the fund remittance process described herein may employ various mechanisms for assuring secure transactions are conducted. The code entry embodiments implemented in connection with the FSC and the SSC may ultimately be determined based on the security configurations adopted by and best suited for banking entity 106. These embodiments and their underlying processes are described in conjunction with process flows 320, 330 and 340 illustrated, respectively, in FIGS. 3B-3D.

Figure 3A:
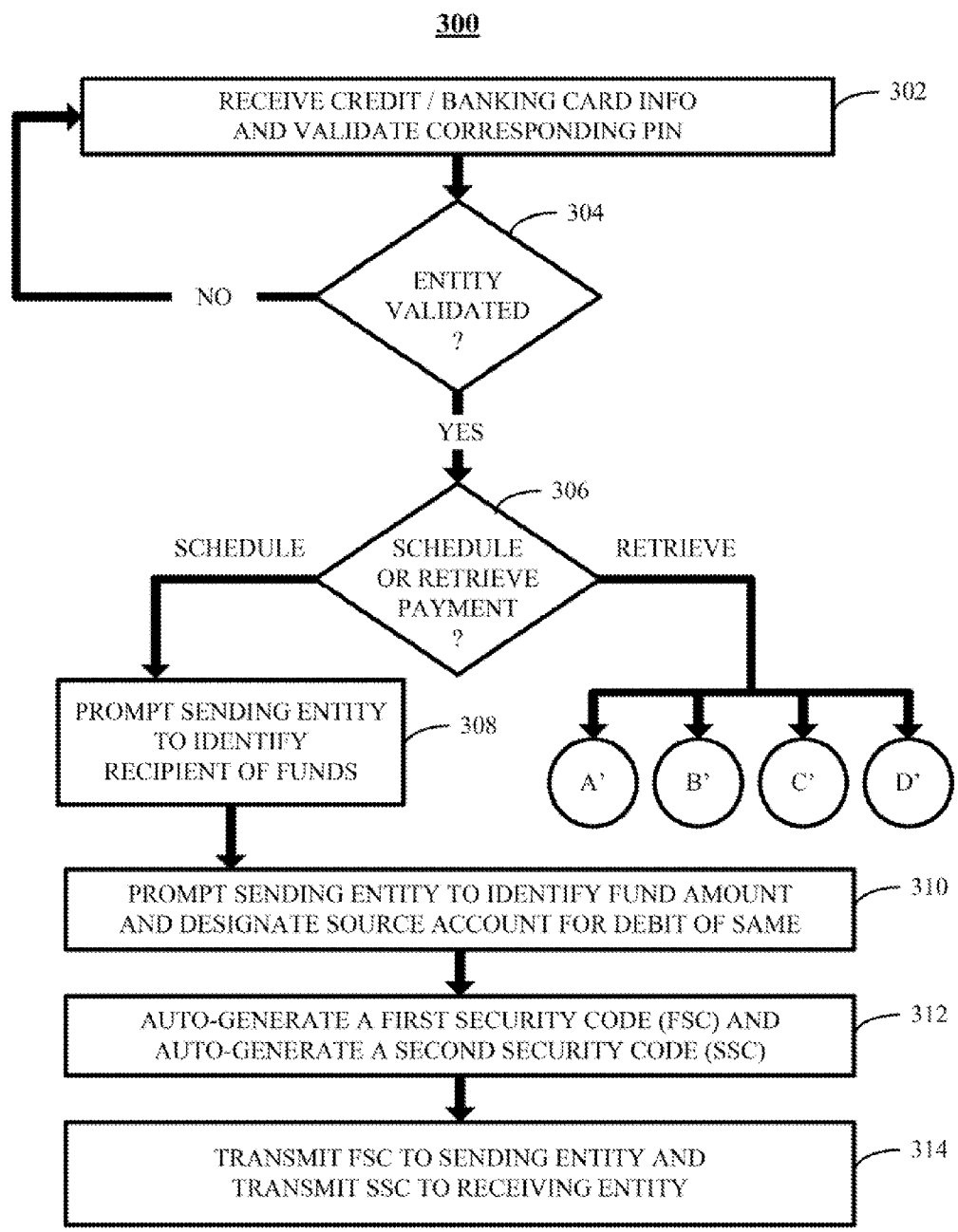
FIGS. 3A-3D are flowcharts illustrating steps directed at requests for scheduling and retrieving a payment as performed by the fund remittance process in accordance with preferred embodiments of the present invention.
Figure 3B:
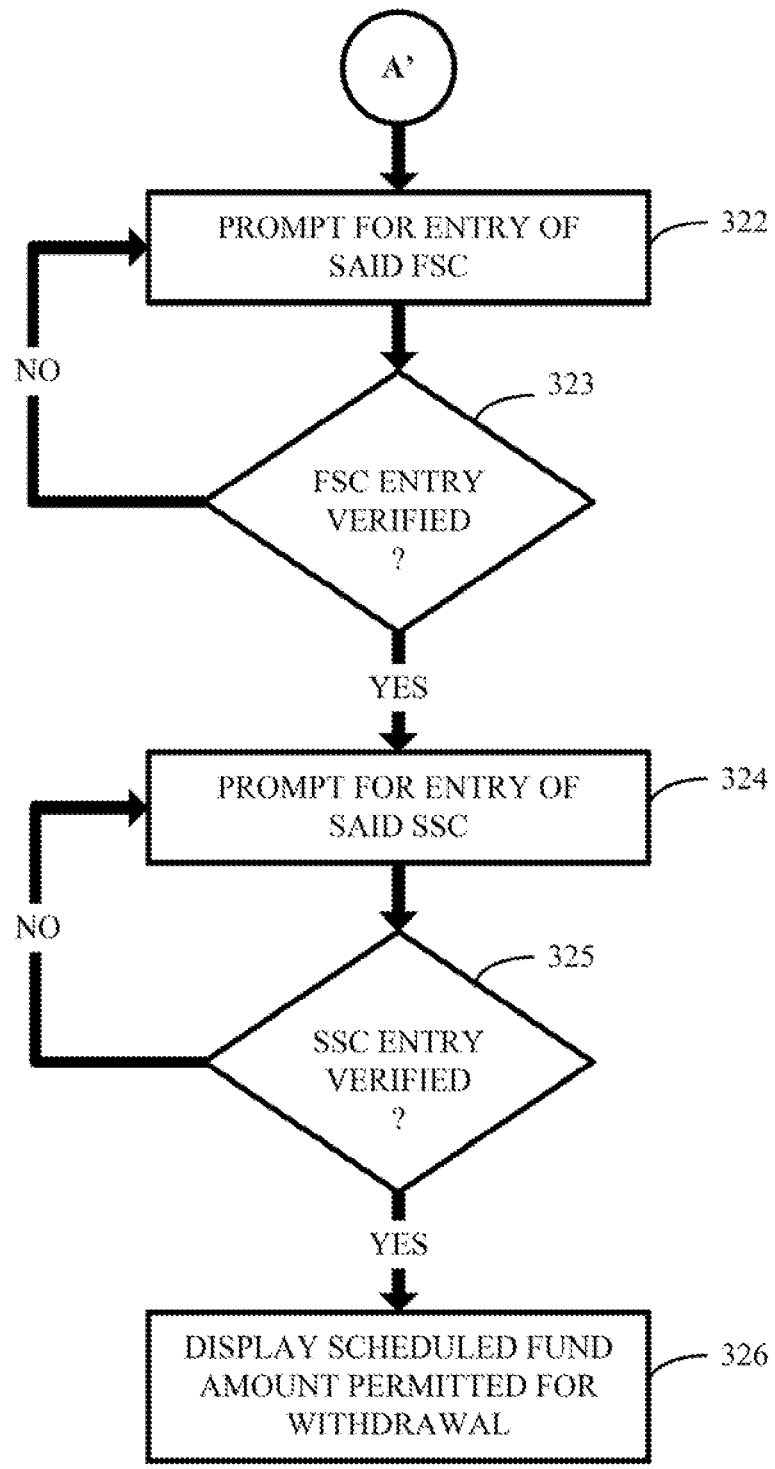

A first embodiment for enabling a secure transaction to retrieve a scheduled payment of funds by receiving entity 104 is described in conjunction with process flow 320 of FIG. 3B. Upon identifying a request to retrieve the scheduled payment, at step 306, payment transaction module 107b of banking entity 106 may transmit instructions to self-service machine 110 to prompt, at step 322, receiving entity 104 to provide the FSC communicated by sending entity 102. A first verification condition may be deployed, at step 323, to verify whether there is a record of the FSC entry received in association with the identity of receiving entity 104. If the first verification condition yields an affirmative response, then payment transaction module 107b of banking entity 106 may transmit further instructions to self-service machine 110 to prompt, at step 324, receiving entity 104 to provide the SSC communicated by banking entity 106 or, alternatively, a representative entity thereof (e.g., vendor entity 108). A second verification condition may be deployed, at step 325, to verify whether there is a record of the SSC entry received in association with the identity of receiving entity 104, in association with the FSC entry verified at step 323 or a combination thereof. If the second verification condition yields an affirmative response, then payment transaction module 107b of banking entity 106 may authorize dispensing of allotted funds and display, at step 326, the scheduled fund amount permitted for withdrawal by receiving entity 104.

Figure 3C:
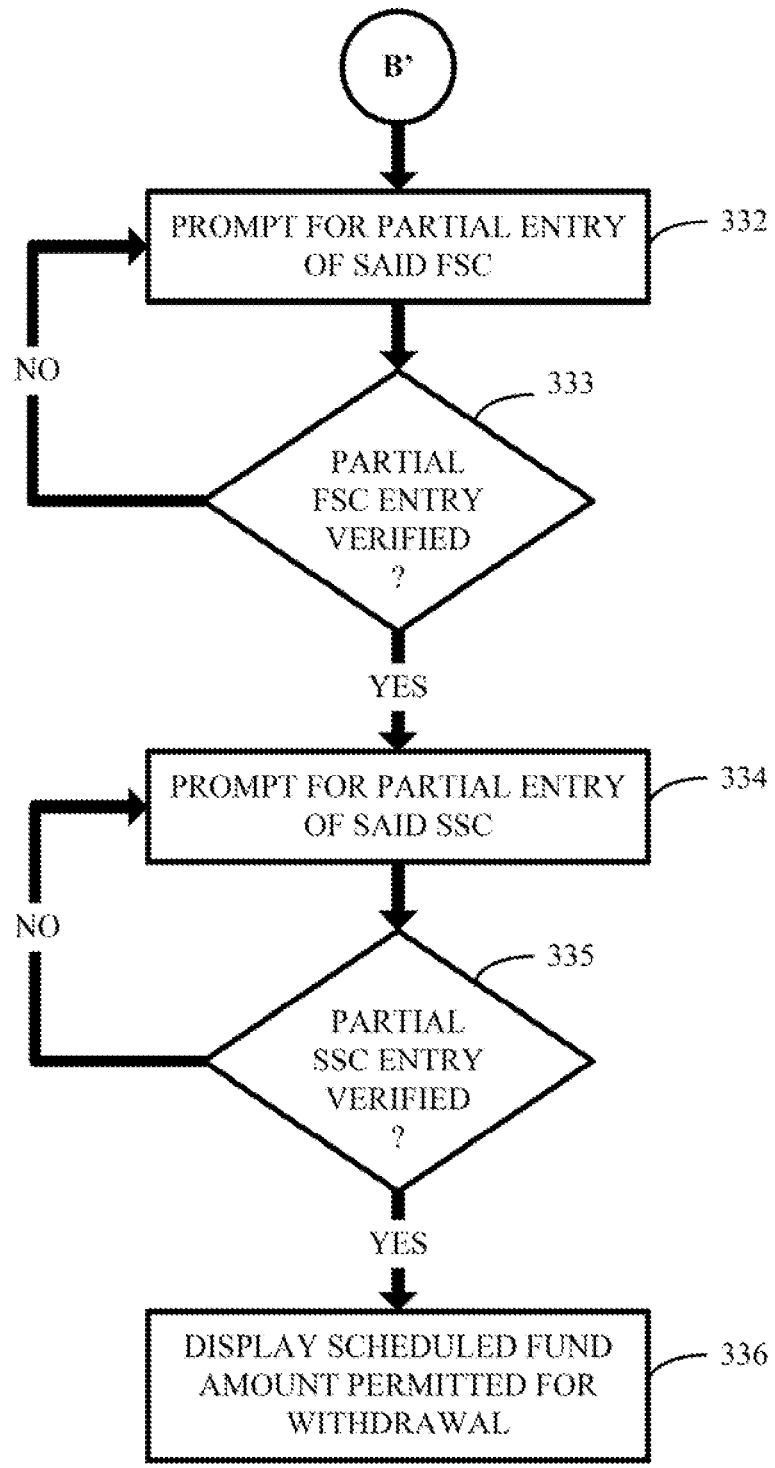

An alternate embodiment for enabling a secure transaction to retrieve a scheduled payment of funds by receiving entity 104 is described in conjunction with process flow 330 of FIG. 3C. In this embodiment, upon identifying a request to retrieve the scheduled payment, at step 306, payment transaction module 107b of banking entity 106 may transmit instructions to self-service machine 110 to prompt, at step 332, receiving entity 104 to provide a partial code entry of the FSC communicated by sending entity 102. Specific instructions may be provided to receiving entity 104, via self-service machine 110, for determining the partial code entry of the FSC requested by payment transaction module 107b. Payment transaction module 107b may employ any one of a plurality of algorithms for determining the partial code entry to be solicited for retrieving a particular scheduled payment. For instance, the algorithm for determining the partial code entry may be configured to randomly select a portion of the FSC and generate corresponding instructions for determining the same.

Similar to process flow 320 of FIG. 3B, a first verification condition may be deployed, at step 333, to verify whether the partial code entry of the FSC was properly entered, and may be further configured to verify whether there is a record of the corresponding FSC in association with the identity of receiving entity 104. If the first verification condition yields an affirmative response, then payment transaction module 107b of banking entity 106 may transmit further instructions to self-service machine 110 to prompt, at step 334, receiving entity 104 to provide a partial code entry of the SSC communicated by banking entity 106 or, alternatively, a representative entity thereof. As described above with respect to the partial code entry of the FSC, receiving entity 104 may be provided with instructions for determining the partial code entry of the SSC. When the partial code entry of the SSC is received, a second verification condition may be deployed, at step 335, to verify whether the partial code entry of the SSC was properly entered, and may be further configured to verify whether there is a record of the SSC entry received in association with the identity of receiving entity 104, in association with the FSC entry verified at step 333 or a combination thereof. If the second verification condition yields an affirmative response, then payment transaction module 107b of banking entity 106 may authorize dispensing of allotted funds and display, at step 336, the scheduled fund amount permitted for withdrawal by receiving entity 104.

It should be noted that instructions provided for determining the partial code entry of the FSC and instructions provided for determining the partial code entry of the corresponding SSC need not be the same. Any partial series of digits may be designated as a qualifying partial code entry for the FSC and the SSC. Additionally, it should be noted that although process flows 320 and 330 are provided with multi-step verification conditions, the fund remittance process of the present invention may utilize more or less verification steps. For example, a one-step verification scheme may be deployed after receiving entries for both the FSC and SSC, or partial code entries of the FSC and the SSC.

Figure 3D:
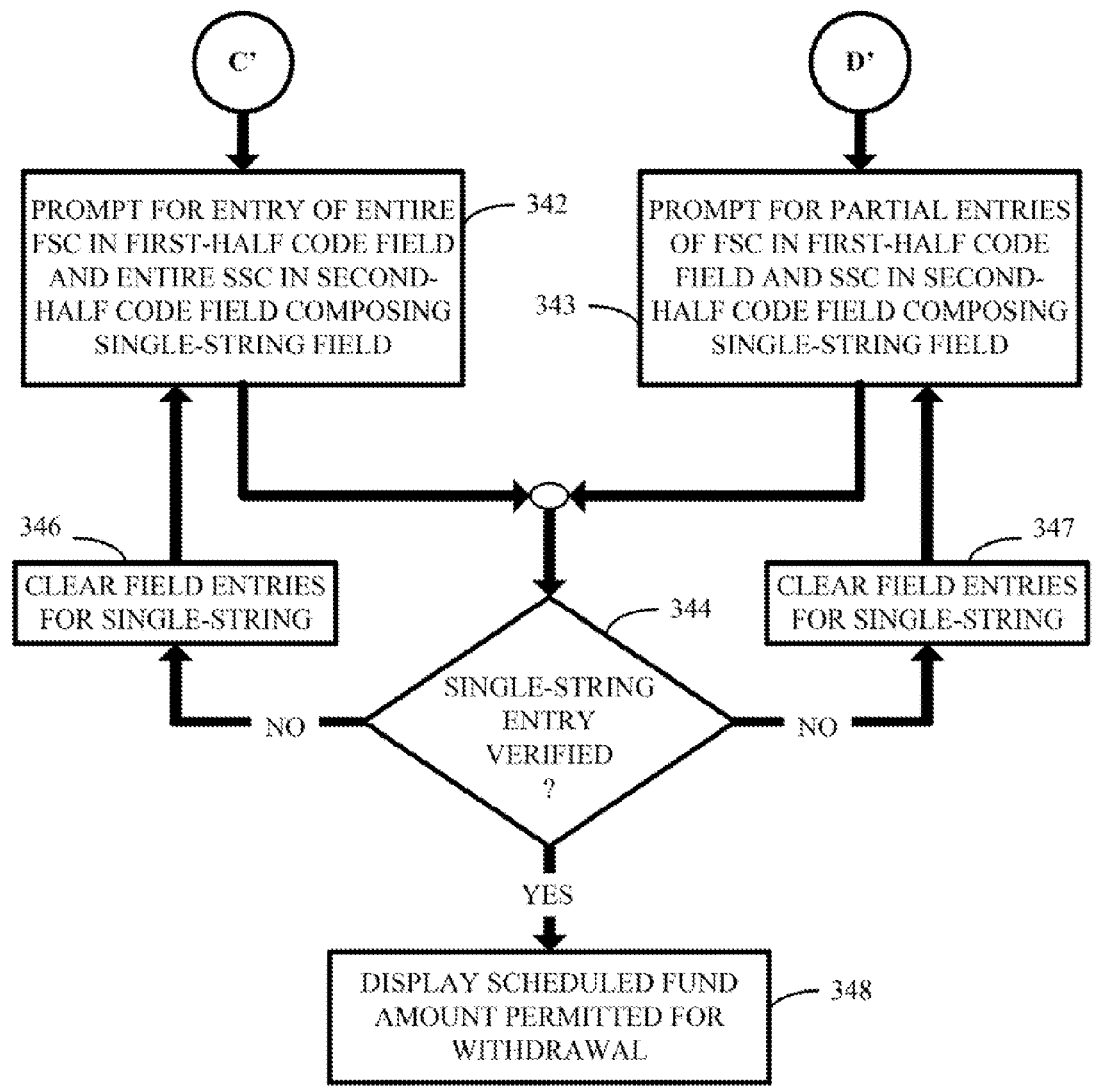

Yet another embodiment for enabling a secure transaction to retrieve a scheduled payment of funds by receiving entity 104 is described in conjunction with process flow 340 of FIG. 3D. In this embodiment, upon identifying a request to retrieve the scheduled payment, at step 306, payment transaction module 107b of banking entity 106 may transmit instructions to self-service machine 110 to prompt receiving entity 104 to provide a single-string code entry, wherein the single-string code entry may be a predetermined ordered sequence of the FSC and the SSC in their entirety or, alternatively, partial combinations thereof. A corresponding single-string entry field may be provided on a display screen of self-service machine 110 for receiving one of the aforementioned selected arrangements of the FSC and the SSC. The presentation of the single-string entry field can take on multiple forms. For example, the single-string entry field can be one continuous open field or may be comprised of subfields, to further simplify the entry process, for receiving the ordered sequence of the FSC and the SSC. An example of the latter field form is described in conjunction with process flow 340.

At step 342, payment transaction module 107b of banking entity 106 may transmit instructions to self-service machine 110 to prompt for entry of the entire FSC in a first half-code subfield and the entire SSC in a second half-code subfield, both subfields collectively composing the single-string field. Application of the sub-field entries may also apply to the alternate arrangement directed at partial combination entries of the FSC and the SSC. At step 343, payment transaction module 107b of banking entity 106 may transmit instructions to self-service machine 110 to prompt for partial entry of the FSC in a first half-code subfield and partial entry of the SSC in a second half-code subfield, both subfields collectively composing the single-string field. The partial entry of the FSC and the SSC may employ similar mechanisms and algorithms as described in conjunction with FIG. 3C. It will also be apparent that the prompts for the two arrangements described above may also be practiced in a reverse configuration, wherein instructions are provided to direct entry of the SSC in the first half-code subfield and the FSC in the second half-code subfield.

Upon receiving the single-string entry, a verification condition may be deployed, at step 344, similar to any one of those previously described in conjunction with process flows 320 and 330 of FIGS. 3B and 3C, respectively. If the determination yields an affirmative response, then payment transaction module 107b of banking entity 106 may authorize dispensing of allotted funds and display, at step 348, the scheduled fund amount permitted for withdrawal by receiving entity 104. If, however, the determination yields a negative response, then the single-string field may be automatically cleared, at step 346 or step 347, and a prompt may be presented to receiving entity 104 to retry entry of the codes. To maintain security measures when prompting for re-entry of the codes, payment transaction module 107b may present a new set of entry instructions that are different from those originally presented in connection with the first attempt for accessing a scheduled payment of funds.

Figure 4:
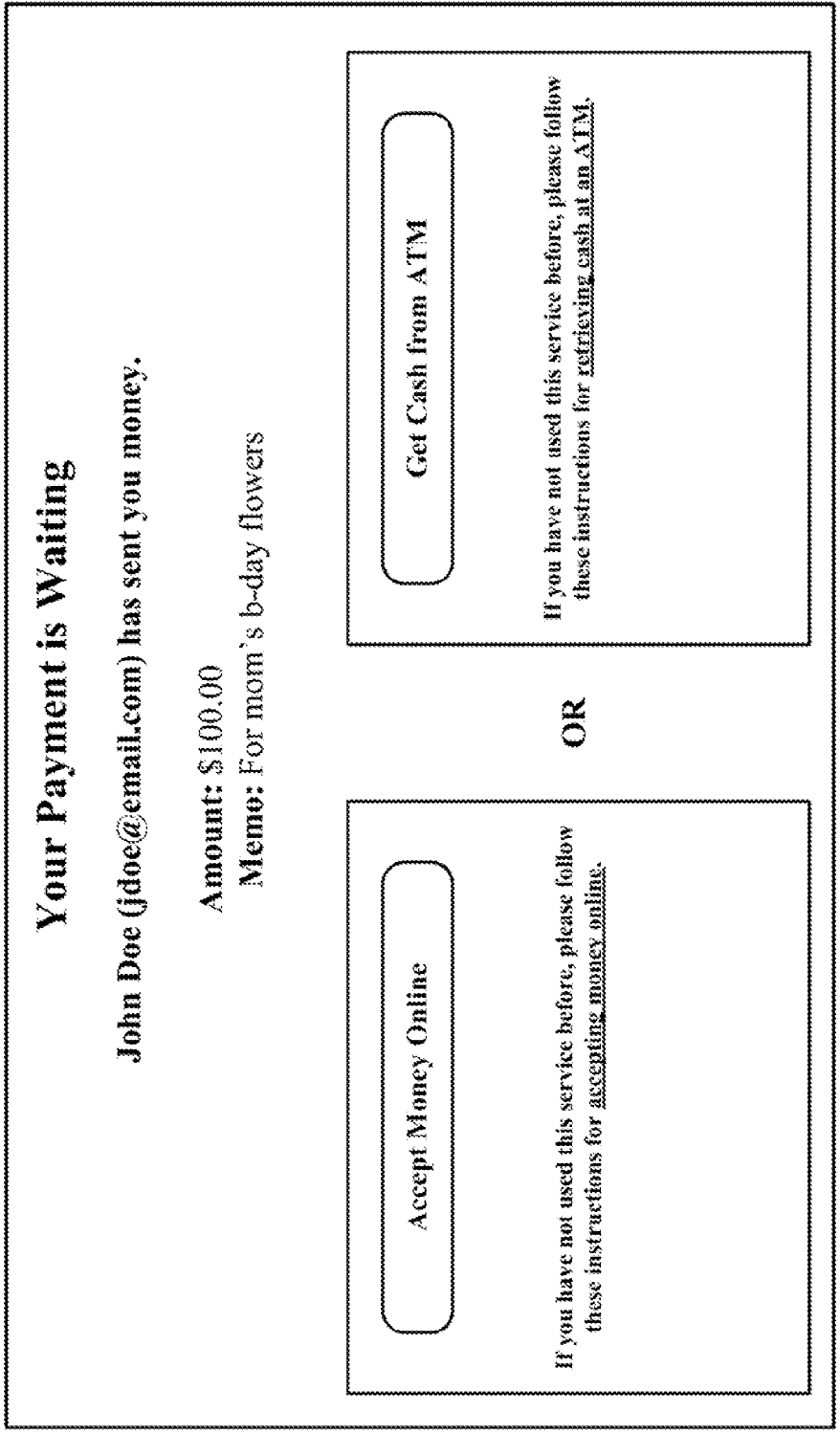
FIG. 4 is an illustrative display of an exemplary e-mail notification generated and transmitted to a designated recipient of funds after processing a request for scheduling a payment in accordance with preferred embodiments of the present invention.

FIGS. 4, 5, 6, 7A-7B, 8A-SC, 9A-9B and 10 are illustrative display screens that may be presented in connection with the fund remittance process described herein. In FIG. 4, a display screen 400 may be presented, for example, to receiving entity 104 via user device 105 to provide notification of a scheduled payment received from sending entity 102. The notification illustrated in display screen 400 may identify the name of sending entity 102, the fund amount that has been scheduled for payment and one or more options for completing the scheduled transaction for retrieving the scheduled payment. When receiving entity 104 receives the notification on display screen 400 and selects an option for retrieving the scheduled payment, further instructions may be provided on subsequent display screens (not shown). For example, if an option to retrieve a scheduled payment at an ATM is selected, instructions may be provided to direct receiving entity 104 to obtain the FSC transmitted to sending entity 102 in response to submitting the request for scheduling the payment.

A series of display screens may be presented to a receiving entity 104 at self-service machine 110 (e.g. an ATM), as illustrated in FIGS. 5, 6, 7A-7BC, 8A-8C, 9A-9B and 10. Although the description that follows makes reference to the foregoing drawing figures, it should be understood that the fund remittance process described herein is not limited to these illustrative arrangements, but are provided merely as a means for further demonstrating and elaborating on the previously disclosed embodiments of the present invention. Alternative arrangements for presenting and soliciting information are well within the scope of the fund remittance process described herein.

Figure 5:
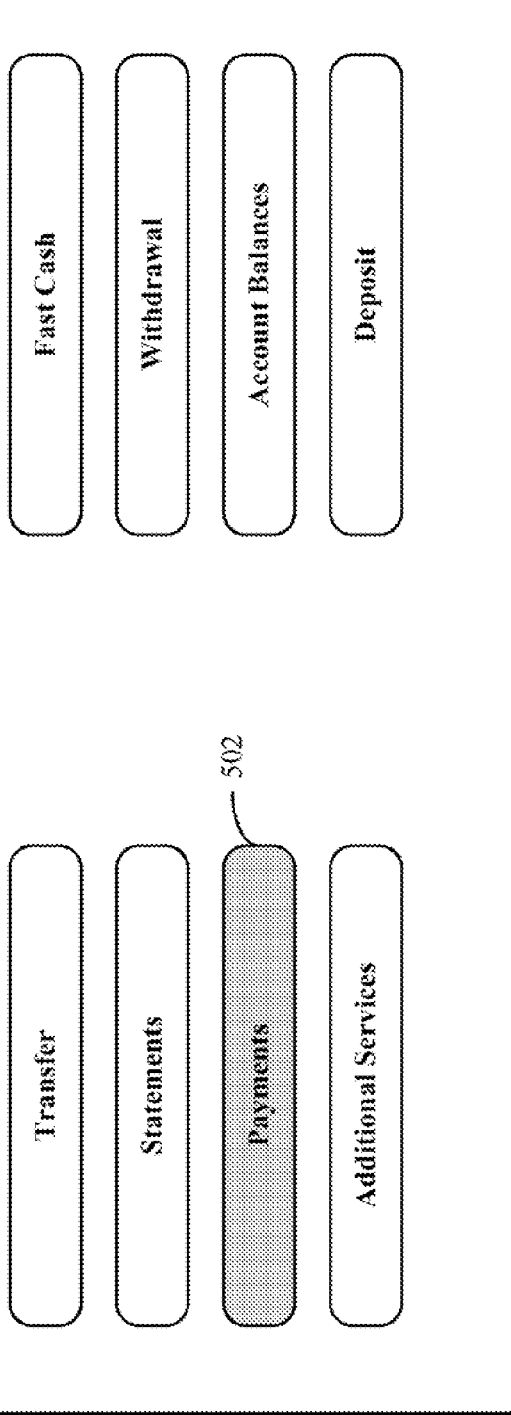
FIG. 5 is an illustrative display of a main menu screen provided to a user engaging with a self-service machine in accordance with preferred embodiments of the present invention.
Figure 7A:
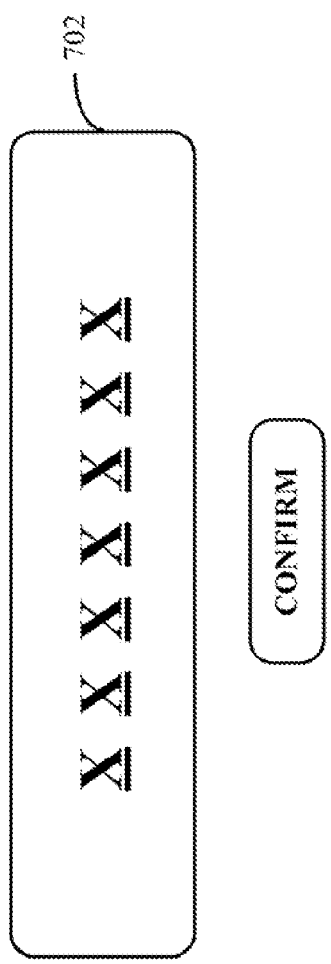
FIGS. 7A-7B are illustrative displays of security code entry screens presented to a user engaging with a self-service machine, the screens prompting the user for entry of two disparate codes for accessing a corresponding scheduled payment of funds, in accordance with preferred embodiments of the present invention.
Figure 7B:
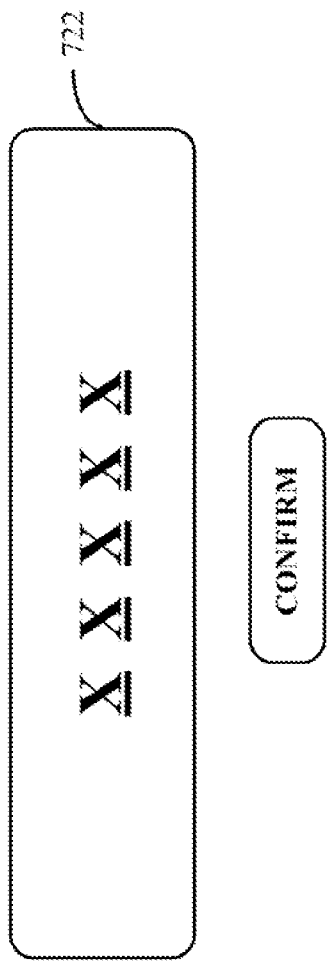
Figure 8B:
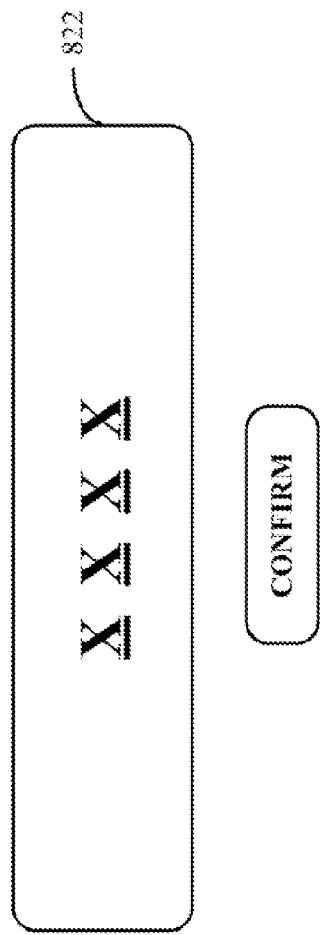

FIG. 5 shows a main transaction screen 500 that may be displayed to receiving entity 104 to allow for interaction with self-service machine 110. As illustrated, main transaction screen 500 may provide receiving entity 104 with a plurality of options for interacting with self-service machine 110. For example, to initiate the process for withdrawing funds associated with a scheduled payment, a payments option 502 may be selected from the plurality of options displayed on main transaction screen 500. Upon selecting payment option 502, an optional fee charge transaction screen 600 may then be displayed, as illustrated in FIG. 6, to receiving entity 104. Fee charge transaction screen 600 provides notice to receiving entity 104 of a fee associated with completing the requested transaction and awaits acceptance of the fee to proceed with the transaction.

As previously described, various code entry embodiments may be implemented via self-service machine 110, requiring receiving entity 104 to provide a FSC and a SSC or, alternatively, a USC comprised at least partially from the FSC and the SSC, for completing a transaction associated with the scheduled payment. These various embodiments are described in conjunction with the transaction screens illustrated in FIGS. 7A-7B, 8A-8C and 9A-9B. In a preferred embodiment, self-service machine 110 prompts receiving entity 104, by displaying security code transaction screen 700 of FIG. 7A, to enter the FSC (i.e., the auto-generated security code received by sending entity 102) in a corresponding code entry field 702. Self-service machine 110, upon receiving the FSC entry, may then further prompt receiving entity 104, by displaying security code transaction screen 720 of FIG. 7B, to enter the SSC (i.e., the auto-generated security code received by receiving entity 104) in a corresponding code entry field 722.

Upon receiving entry of both the FSC in code entry field 702 and the SSC in code entry field 722, the FSC and SSC entries may then be communicated from self-service machine 110 to payment transaction module 107b to verify that the proper FSC and SSC combination have been entered in relation to the scheduled payment receiving entity 104 is attempting to transact. Verification processes employed by payment transaction module 107b may be performed after both the FSC and SSC entries are received. Yet, in another embodiment, verification may be performed by payment transaction module 107b in multiple instances. For example, payment transaction module 107b may execute verification processes after receiving entry of the FSC in code entry field 702 and then again after receiving entry of the SSC in code entry field 722. Regardless of the verification processes employed, if multiple instances of unmatched FSC and SSC entries are received, payment transaction module 107b may be configured to transmit a command to flag for review or terminate the transaction. In terminating the transaction, for example, the scheduled payment may be suspended for a predefined period of time or canceled in its entirety.

In another embodiment, receiving entity 104 may be required to enter an altered variation of the FSC and the SSC, thereby ultimately supplying one or more security codes that are differentiated from those actually received. For example, as previously described in conjunction with process flow 330 of FIG. 3C, payment transaction module 107b of banking entity 106 may communicate to receiving entity 104 via self-service machine 110 to request partial code entries of the FSC and the SSC. An exemplary configuration of this alternate embodiment is demonstrated in security code transaction screens 800, 820 and 840, as illustrated respectively in FIGS. 8A, 8B and 8C.

Transaction screen 800 illustrated in FIG. 8A may be displayed to receiving entity 104 when payment option 502 is selected from the plurality of options displayed on main transaction screen 500. Transaction screen 800 may communicate specific instructions to receiving entity 104 relating to partial code entry of the FSC. For example, a prompt may request entry of the first six digits of a seven digit code, representative of the FSC, which was transmitted directly to sending entity 102 and subsequently communicated by sending entity 102 to receiving entity 104. The partial code entry of the FSC may be received at code entry field 802 of transaction screen 800. Self-service machine 110, upon receiving the partial code entry of the FSC, may then communicate specific instructions to receiving entity 104 relating to partial code entry of the SSC. For example, a subsequent prompt may request entry of the last four digits of a five digit code, representative of the SSC, which was transmitted directly to receiving entity 104. The partial code entry of the SSC may be received at code entry field 822 of transaction screen 820. Verification processes, similar to those previously described, may be performed against the security codes received in code entry fields 802 and 822 after each entry or, alternatively, after both entries are received.

In yet another embodiment, receiving entity 104 may be required to enter an ordered sequence of the FSC and the SSC, whether in their entirety or partially (as previously described in conjunction with FIG. 3D), as a single-string code entry, thereby further enhancing security measures by introducing an alternate disparate form of the originally transmitted security codes. This embodiment is better understood with reference to transaction screen 900, 920 and 940 illustrated, respectively, in FIGS. 9A-9C.

As illustrated in transaction screens 900 and 920, self-service machine 110 may communicate specific instructions directed at the order in which the FSC and the SSC are entered in their entirety, respectively, into single-string code entry fields 902 and 922. In transaction screen 900, for example, a prompt may be presented requesting entry of a seven digit code, representative of the FSC, followed by entry of a five digit code, representative of the SSC, in single-string code entry field 902. Similarly, in transaction screen 920, a prompt may be presented requesting entry of a five digit code, representative of the SSC, followed by entry of a seven digit code, representative of the FSC, in single-string code entry field 922. The single-string format may also be applied to partial code entries of the FSC and the SSC, as illustrated in transaction screen 940. For example, a prompt may be presented requesting entry of the last four digits of a seven digit code, representative of the FSC, followed by the first three digits of a five digit code, representative of the SSC, in a single-string code entry field 942. It should be noted that other modes of operation for single-string entry of security codes are envisioned and well within the scope of the fund remittance process described herein.

Upon affirmative validation of the security code entries received at payment transaction module 107b, details of the scheduled payment may then be transmitted back for display on self-service machine 110. Transaction screen 1000, illustrated in FIG. 10, may provide receiving entity 110 with details associated with the scheduled payment, such as the fund amount that has been allocated for the scheduled payment transaction and an expiration date associated with withdrawal of the allocated fund amount. The expiration date may be set by sending entity 102 or may be regulated by banking entity 106. An option may be presented, via transaction screen 1000, to withdraw the allocated fund amount. If an affirmative response to withdraw funds is received, payment transaction module 107b may then transmit instructions back to self-service machine 110 for dispending the allocated fund amount to receiving entity 104. Upon dispensing the allocated fund amount, the source account of sending entity 102 may then be debited in accordance with fee terms established between sending entity 102 and banking entity 106.

The foregoing description is provided for illustrating the principles of the present invention and it is foreseeable that various modifications can be made by those skilled in the art without departing from the spirit and scope of the invention described herein. Therefore, one skilled in the art will appreciate that the present invention can be practiced by other than the described embodiments, which are presented for purposes of illustration and not by way of limitation, and the present invention is limited only by the claims that follow.

We claim:

1. A computer-implemented method for managing remittance of funds, said method comprising the steps of:
receiving a first electronic request, at a host computer, from a sending entity for scheduling a payment, said first electronic request comprised of information for identifying a receiving entity, a monetary amount to be made available for withdrawal by said receiving entity and a designated source account for debiting said monetary amount;
acquiring, at said host computer, a first security code in response to said first electronic request;
acquiring, at said host computer, a second security code in response to said first electronic request;
storing, at said host computer, a record correlating said first security code and said second security code with said scheduled payment;
receiving a second electronic request, at said host computer, from said receiving entity for retrieving said monetary amount associated with said scheduled payment;
transmitting, from said host computer, instructions for use of said first security code and said second security code in response to receiving said second electronic request, said instructions prompting said receiving entity to provide a transaction code comprising a portion of said first security code and a portion of said second security code; and
presenting an option to withdraw said monetary amount upon validating said transaction code received at said host computer.

2. The computer-implemented method of claim 1, wherein said host computer is associated with a banking entity and is configured for processing said first electronic request and said second electronic request.

3. The computer-implemented method of claim 1, wherein said host computer is associated with a banking entity and is tasked with automatically generating at least one of said first security code and said second security code.

4. The computer-implemented method of claim 1, wherein said second security code is automatically generated by a programmed computer associated with a vendor entity, said programmed computer associated with said vendor entity being tasked with automatically generating said second security code upon receiving an electronic indication from said host computer that said first electronic request has been received.

5. The computer-implemented method of claim 1, wherein said information for identifying said receiving entity is comprised at least of a name, home address and e-mail address corresponding to said receiving entity.

6. The computer-implemented method of claim 1, wherein said first security code is electronically communicated to said sending entity.

7. The computer-implemented method of claim 6, wherein said first security code is electronically communicated to said sending entity via an e-mail transmission, an SMS transmission or a computer-automated voice message transmission.

8. The computer-implemented method of claim 6, wherein said first security code electronically communicated to said sending entity is subsequently electronically communicated from a device associated with said sending entity to a device associated with said receiving entity.

9. The computer-implemented method of claim 1, wherein said second security code is electronically communicated to said receiving entity, and wherein said second security code is not electronically communicated to said sending entity.

10. The computer-implemented method of claim 9, wherein said second security code is electronically communicated to said receiving entity via an e-mail transmission, an SMS transmission or a computer-automated voice message transmission.

11. The computer-implemented method of claim 1, wherein said host computer is communicatively coupled to a self-service machine.

12. The computer-implemented method of claim 11, wherein said second electronic request is initiated from said self-service machine for processing at said host computer.

13. The computer-implemented method of claim 11, wherein said instructions are transmitted from said host computer for presentation on a display of said self-service machine.

14. The computer-implemented method of claim 1, wherein said monetary amount is debited from said source account after said option to withdraw said monetary amount is exercised.

15. The computer-implemented method of claim 1, wherein said portion of said first security code and said portion of said second security code are entered in combination to provide said transaction code.

16. A non-transitory computer-readable storage medium carrying one or more sequences of instructions for implementing a method for managing remittance of funds, wherein execution of the one or more sequences of instructions by one or more computers causes the one or more computers to perform the steps of:
   receiving a first electronic request from a sending entity for scheduling a payment, said first electronic request comprised of information for identifying a receiving entity, a monetary amount to be made available for withdrawal by said receiving entity and a designated source account for debiting said monetary amount;
   acquiring a first security code in response to said first electronic request;
   acquiring a second security code in response to said first electronic request;
   storing a record correlating said first security code and said second security code with said scheduled payment;
   receiving a second electronic request from said receiving entity for retrieving said monetary amount associated with said scheduled payment;
   transmitting instructions for use of said first security code and said second security code in response to receiving said second electronic request, said instructions prompting said receiving entity to provide a transaction code comprising a portion of said first security code and a portion of said second security code; and
   presenting an option to withdraw said monetary amount upon validating said transaction code received at said host computer.

\* \* \* \* \*